US012726058B2

(12) United States Patent
Fatdachow et al.

(10) Patent No.: US 12,726,058 B2

(45) Date of Patent: Sep. 1, 2026

(54) STATOR ARRANGEMENT WITH HIGH-VOLTAGE INTERFACE AND METHOD FOR MANUFACTURING A STATOR ARRANGEMENT

(71) Applicant: Robert Bosch GmbH, Stuttgart (DE)

(72) Inventors: Muzaffar Fatdachow, Hemmingen (DE); Markus Pechinger, Stuttgart (DE); Steffen Buhl, Sachsenheim-Spielberg (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 18/292,544

(22) PCT Filed: Jul. 6, 2022

(86) PCT No.: PCT/EP2022/068714

§ 371 (c)(1),
(2) Date: Jan. 26, 2024

(87) PCT Pub. No.: WO2023/006364

PCT Pub. Date: Feb. 2, 2023

(65) Prior Publication Data

US 2025/0088049 A1 Mar. 13, 2025

(30) Foreign Application Priority Data

Jul. 29, 2021 (DE) .................... 10 2021 208 196.7

(51) Int. Cl.
*H02K 1/20* (2006.01)
*H02K 5/22* (2006.01)

(52) U.S. Cl.
CPC .............. *H02K 1/20* (2013.01); *H02K 5/225* (2013.01); *H02K 2203/09* (2013.01)

(58) Field of Classification Search
CPC ..................................................... H02K 5/225
See application file for complete search history.

(56) References Cited

U.S. PATENT DOCUMENTS

2018/0331594 A1* 11/2018 Yagyu ...................... F28F 1/16
2022/0247254 A1* 8/2022 Wehlen ................. H02K 9/197

FOREIGN PATENT DOCUMENTS

CN 107834740 A * 3/2018 .............. H02K 5/04
CN 112360741 A * 2/2021 .............. H02K 5/10
DE 102016225342 A1 6/2018
DE 102019205751 A1 * 10/2020 ............ H02K 9/197
JP 2002233107 A 8/2002

(Continued)

OTHER PUBLICATIONS

Meng (CN 112360741 A) English Translation (Year: 2021).*

(Continued)

*Primary Examiner* — Tulsidas C Patel
*Assistant Examiner* — Robert E Mates
(74) *Attorney, Agent, or Firm* — Michael Best & Friedrich LLP

(57) ABSTRACT

A stator arrangement (20) having a high-voltage interface (30) for establishing an electrical connection between a stator (25) and a high-voltage electronic system (35). In order to simplify manufacture of the stator arrangement (20), the high-voltage interface (30) is combined with a centering element (38) centered on a cooling sleeve (24) that encloses a receiving space for the stator (25).

9 Claims, 3 Drawing Sheets

(56) References Cited

FOREIGN PATENT DOCUMENTS

| | | | |
|---|---|---|---|
| JP | 2011015578 | A | 1/2011 |
| JP | 2012502606 | A | 1/2012 |
| JP | 2012186913 | A | 9/2012 |
| JP | 2015209845 | A | 11/2015 |
| JP | 2017500838 | A | 1/2017 |
| JP | 2018174604 | A | 11/2018 |
| JP | 2019520030 | A | 7/2019 |
| JP | 2020089228 | A | 6/2020 |
| JP | 2021027733 | A | 2/2021 |
| WO | 2015078459 | A2 | 6/2015 |
| WO | 2017110408 | A1 | 6/2017 |
| WO | 2021139982 | A1 | 7/2021 |

OTHER PUBLICATIONS

Li (CN 107834740 A) English Translation (Year: 2018).*

Translation of International Search Report for Application No. PCT/EP2022/068714 dated Nov. 7, 2022 (2 pages).

* cited by examiner 35
33
32
30
31
27
28
21
29
24
20
22
23
25
38

STATOR ARRANGEMENT WITH HIGH-VOLTAGE INTERFACE AND METHOD FOR MANUFACTURING A STATOR ARRANGEMENT

BACKGROUND

The invention relates to a stator arrangement having a high-voltage interface for establishing an electrical connection between a stator and a high-voltage electronic system. The invention further relates to a method of manufacturing such a stator arrangement.

From the German disclosure document DE 10 2016 225 342 A1, a stator arrangement of an electrical machine with a housing and with a stator is known, which has a stator base body and at least one winding head, wherein the stator base body and the winding head are encapsulated in a thermally conductive epoxy resin.

SUMMARY

The purpose of the invention is manufacturing of a stator arrangement having a high-voltage interface for establishing an electrical connection between a stator and a high-voltage electronic system.

The task is solved in a stator arrangement with a high-voltage interface for establishing an electrical connection between a stator and high-voltage electronic system, in that the high-voltage interface is combined with a centering element centered on a cooling sleeve, which comprises a stator receiving space for the stator. The cooling sleeve is used to establish a cooling system for the stator arrangement. For cooling, a cooling fluid can be fed through the cooling sleeve or along the cooling sleeve. For example, the stator comprises a stator base body with stator windings, stator irons, and winding heads. During potting, impregnation and/or overmolding, the stator is penetrated and surrounded by a casting resin, impregnation resin and/or plastic material. The high-voltage electronic system comprises, for example, an inverter. The inverter can be arranged separately from the stator arrangement. The stator arrangement advantageously serves together with a rotor to establish an electromotive drive for a gas conveying device, in particular for an air compressor. In a preferred embodiment of the air compressor, the high-voltage electronic system, in particular the inverter, is housed together with the stator in a common housing. Such an air compressor is also called an integrated electrically driven air compressor. The high-voltage interface is used to establish an electrical connection between the high-voltage electronic system and the electric motor drive, in particular the stator arrangement with the stator. The centering element creates an interface between the cooling sleeve and the stator, which can also be referred to as the stator unit. With the centering element, the stator or stator unit can advantageously be fully centered, in particular on an outer diameter of the cooling sleeve. An interference fit between the centering element and the cooling sleeve can be used for sealing.

A preferred embodiment example of the stator arrangement is characterized in that the centering element comprises an annular body with which the centering element is attached to one end of the cooling sleeve. This provides a simple, robust and cost-effective interface geometry between the stator or stator unit and the cooling sleeve.

Another preferred embodiment example of the stator arrangement is characterized in that the annular body has a centering ring with which the centering element is fully centered on an outer diameter of the cooling sleeve. This enables optimum centering on the cooling sleeve with very good positioning accuracy. In addition, a robust and secure seal is provided by an interference fit and/or by an additional sealing element.

Another preferred embodiment example of the stator arrangement is characterized in that the centering ring of the centering element is frictionally connected to the cooling sleeve. An appropriate interference fit is a simple way of ensuring a high-pressure tight seal between the centering ring and the cooling sleeve.

Another preferred embodiment example of the stator arrangement is characterized in that a radial O-ring is arranged between the cooling sleeve and the centering ring for sealing. For example, the O-ring is received in an annular groove on an outer circumference of the centering sleeve. The radial O-ring can be provided as an alternative or in addition to the previously described interference fit.

Another preferred embodiment example of the stator arrangement is characterized in that the annular body is in full-surface contact with an end face of the cooling sleeve. Due to the end-face contact, undesirable angular errors can be avoided.

Another preferred embodiment example of the stator arrangement is characterized in that a connection portion extends radially outwardly from the annular body. Electrical connection leads extend through the connection portion from the stator to the high voltage electronic system. The connection leads can be designed as busbars or contact tongues.

Another preferred embodiment example of the stator arrangement is characterized in that connecting sleeves are arranged radially outwardly on a connection portion, extending from the connection portion in the axial direction. This simplifies the connection of the high-voltage electronic system to the stator arrangement.

In a method of manufacturing a stator arrangement described above, the above task is alternatively or additionally solved by centering the stator with the centering element on the cooling sleeve before the stator is molded and/or overmolded with the high-voltage interface. In this way, the stator can be positioned very accurately in the stator receiving space of the cooling sleeve in a simple manner.

The invention further relates to a centering element and/or a cooling sleeve for a stator arrangement described above. The centering element and the cooling sleeve can be traded separately.

The invention may also relate to a gas delivery device, in particular an air compressor, for providing a gas, in particular for providing compressed air, in a fuel cell system, with a stator arrangement described above.

Further advantages, features, and details of the invention arise from the following description, in which various embodiment examples are described in detail with reference to the drawing.

DETAILED DESCRIPTION

Figure 1:
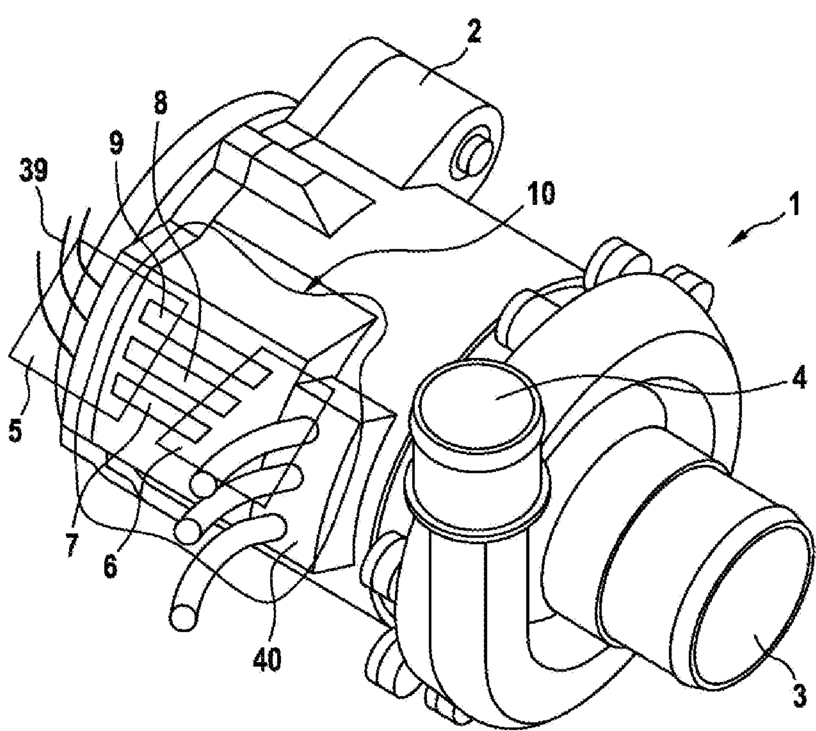
FIG. 1 a perspective view of an air supply device with a housing in which a control connecting element is connected to a power connecting element via busbars.

FIG. 1 shows an air supply device 1 in perspective. The air supply device 1 is also referred to as an air compressor and is used in a mobile fuel cell system to provide compressed air. In turn, the mobile fuel cell system is used in a motor vehicle equipped with the fuel cell system to provide electrical energy, which is converted into drive energy for the motor vehicle via an electric motor, for example.

The air supply device 1 comprises a multi-part housing 2 with an air connecting port 3 through which air is supplied and with an air connecting port 4 through which compressed air is discharged. For example, to compress the air, the air supply device 1 comprises a compressor wheel that is rotatable within a compressor volute.

The compressor wheel is driven by an electric motor arranged in the housing 2. The electric motor comprises a rotor that is rotatable within a stator.

The stator of the electric motor comprises a power connecting element 5, via which alternating current is supplied to the stator in three phases. The power connecting element 5 is connected to a control connecting element 6 via a connection element 10, which comprises three elongated contact parts 7, 8, 9.

The control connecting element 6 is combined, for example, with a cable outlet 40 which, as indicated by three outgoing cables 39, is connected to a separately arranged inverter not shown in FIG. 1. However, the inverter can also be integrated into the housing 2 of the air supply device 1. Then the cable outlet 40 is omitted.

Figures 2, 3:
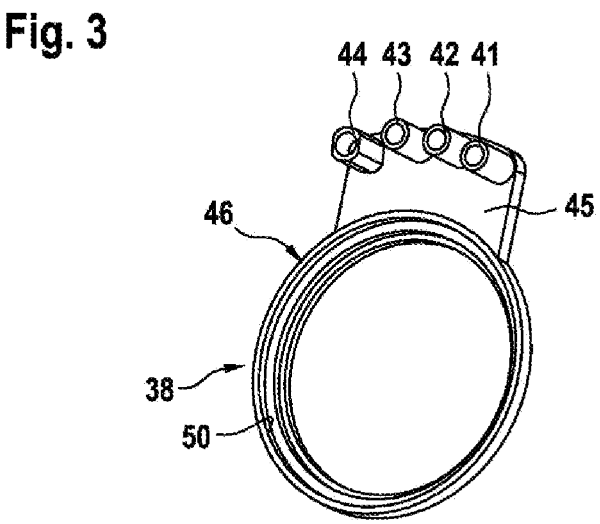
FIG. 2 a perspective view of a stator arrangement with a high-voltage interface integrated into a centering element centered on a cooling sleeve.
FIG. 3 a perspective view of the centering element of FIG. 2 alone.
Figure 4:
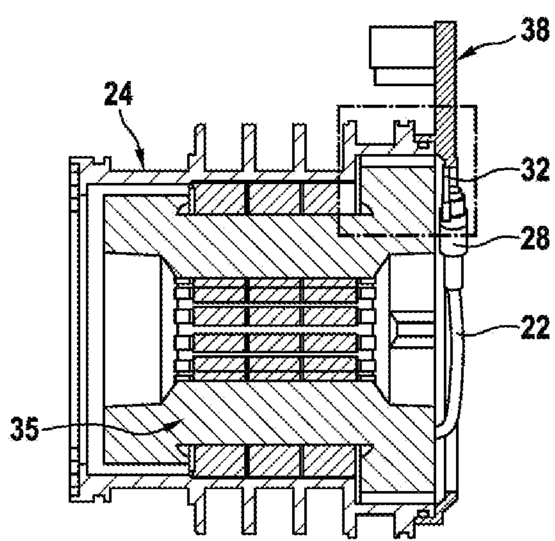
FIG. 4 is a longitudinal section of the stator arrangement of FIG. 4.
Figure 5:
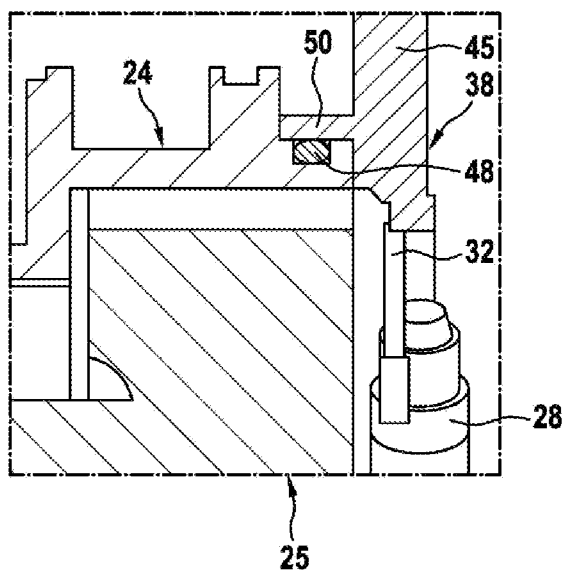
FIG. 5 shows an enlarged section of FIG. 4 with a radial O-ring between the cooling sleeve and a centering ring of the centering element.

FIGS. 2 and 4 show a stator arrangement 20 with a stator 25 in various views. The stator 25 is arranged in a stator receiving space of a cooling sleeve 24.

The stator 25 comprises a stator base body with stator irons, stator windings, and winding heads, the structure and function of which are known. Within the stator 25 is a rotor, not shown, which is used to establish an electric motor drive of the air supply device shown in FIG. 1.

The cooling sleeve 24 is advantageously arranged together with high-voltage electronic system 35, which is only indicated in FIG. 2, within a common housing of the air supply device designed as an air compressor. A cooling medium, such as cooling water, advantageously flows around the outer circumference of the cooling sleeve. The cooling sleeve 24 is used to establish a cooling system for the stator 25, which can become very hot during operation at very high rotor speeds in excess of one hundred thousand revolutions per minute.

FIG. 2 shows that stator leads 21, 22, 23 extend from the end of stator 25 visible there. The stator leads 21 through 23 are electrically connected to the high-voltage electronic system 35 via a high-voltage interface 30. For example, the high voltage electronic system 35 comprises an inverter.

The high-voltage interface 30 is combined with a centering element 38. The centering element 38 comprises an annular body 46 which is in full contact with an end face of the cooling sleeve 24 shown on the right in FIG. 4. A connection portion 45 extends radially outward from the annular body 46 of the centering element 38.

Four connecting sleeves 41 through 44 are formed on the connection portion 45, which are substantially in the shape of straight circular cylinder jackets. The connecting sleeves 41 through 44 extend in the axial direction.

The term axial refers to an axis of rotation of a rotor rotatable in the stator 25. Axial means in the direction of or parallel to this axis of rotation. Analogously, the term radial means transverse to this axis of rotation.

Cable ends 27 through 29 of the stator leads 21 through 23 are connected inside the annular body 36 to contact tongues 31, 32, 33 which project radially inward from the annular body 46. The cable ends 27 through 29 are assigned the connecting sleeves 41 through 43 on the inverter side. The fourth connecting sleeve 44 is used to establish another function, which will not be discussed here.

In FIGS. 3 and 4, it can be seen that the centering element 38 includes a centering ring 50 that is substantially in the shape of a straight circular cylinder barrel portion. The centering ring 50 is fully centered on an outer diameter of the cooling sleeve 24, as can be seen from a review of FIGS. 2 through 4.

For sealing, the connection between the centering ring 50, the centering element 38 and the outer circumference of the cooling sleeve 24 is designed as an interference fit. Alternatively or additionally, a radial O-ring 48 is provided for sealing between the cooling sleeve 24 and the centering ring 50 of the centering element 38.

What is claimed is:

1. A method of manufacturing a stator arrangement (20), the stator arrangement (20) having a high-voltage interface (30) for establishing an electrical connection between a stator (25) and a high-voltage electronic system (35), wherein the high-voltage interface (30) is combined with a centering element (38) centered on a cooling sleeve (24) that comprises a stator receiving space for the stator (25), wherein the stator (25) is centered on the cooling sleeve (24) with the centering element (38) before the stator (25) is molded or overmolded with the high-voltage interface (30).

2. The method according to claim 1, wherein the centering element (38) comprises an annular body (46) by which the centering element (38) is secured to an end of the cooling sleeve (24).

3. The method according to claim 2, wherein the annular body (46) includes a centering ring (50) by which the centering element (38) is fully centered on an outer diameter of the cooling sleeve (24).

4. The method according to claim 3, wherein the centering ring (50) of the centering element (38) is connected to the cooling sleeve (24) with an interference fit.

5. The method according to claim 3, wherein a radial O-ring (48) is arranged for sealing between the cooling sleeve (24) and the centering ring (50).

6. The method according to claim 2, wherein the annular body (46) rests over its entire surface against an end face of the cooling sleeve (24).

7. The method according to claim 2, wherein a connection portion (45) extends radially outwardly from the annular body (46).

8. The method according to claim 7, wherein connecting sleeves (41-44) are arranged radially outwardly on the connection portion (45) and extend from the connection portion (45) in an axial direction.

9. The method according to claim 4, wherein the interference fit is defined between the centering ring (50) and an outer diameter of the cooling sleeve (24).

* * * * *